US012604305B2

(12) United States Patent
Zhang et al.

(10) Patent No.: US 12,604,305 B2
(45) Date of Patent: Apr. 14, 2026

(54) METHOD FOR TRANSMITTING UPLINK DATA AND CONTROL INFORMATION AND APPARATUS THEREOF

(71) Applicant: Samsung Electronics Co., Ltd., Suwon-si (KR)

(72) Inventors: Sa Zhang, Beijing (CN); Yi Wang, Beijing (CN); Feifei Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 17/917,676

(22) PCT Filed: Apr. 7, 2021

(86) PCT No.: PCT/KR2021/004353
§ 371 (c)(1),
(2) Date: Oct. 7, 2022

(87) PCT Pub. No.: WO2021/206448
PCT Pub. Date: Oct. 14, 2021

(65) Prior Publication Data
US 2023/0156685 A1 May 18, 2023

(30) Foreign Application Priority Data
Apr. 9, 2020 (CN) ......................... 202010276152.X

(51) Int. Cl.
*H04W 72/11* (2023.01)
*H04L 1/1812* (2023.01)
(Continued)

(52) U.S. Cl.
CPC ........... *H04W 72/11* (2023.01); *H04L 1/1812* (2013.01); *H04W 72/12* (2013.01); *H04W 72/21* (2023.01)

(58) Field of Classification Search
None
See application file for complete search history.

(56) References Cited

U.S. PATENT DOCUMENTS 10,772,085 B2 * 9/2020 Yin ..................... H04W 74/004
12,255,846 B2 * 3/2025 Zhang ................... H04L 5/0055
(Continued)

FOREIGN PATENT DOCUMENTS

CN 104685955 A 6/2015
CN 106301720 A 1/2017
(Continued)

OTHER PUBLICATIONS

European Search Report dated Aug. 23, 2023, issued in European Application No. 21785498.3.
(Continued)

*Primary Examiner* — Hassan A Phillips
*Assistant Examiner* — Gautam Sharma
(74) *Attorney, Agent, or Firm* — Jefferson IP Law, LLP

(57) ABSTRACT

A method performed by a user equipment (UE) in a wireless communication system, the method comprising: receiving, from a base station, first information associated with a physical uplink control channel (PUCCH) resource associated with hybrid automatic request—acknowledgement (HARQ-ACK); receiving, from the base station, a physical downlink shared channel (PDSCH); identifying the PUCCH resource based on second information associated with HARQ-ACK which is obtained from the first information, and third information associated with uplink control information (UCI); transmitting, to the base station, HARQ-ACK information for the PDSCH and at least one scheduling request (SR) via the identified PUCCH resource.

16 Claims, 2 Drawing Sheets

(51) Int. Cl.
*H04W 72/12* (2023.01)
*H04W 72/21* (2023.01)

(56) References Cited

U.S. PATENT DOCUMENTS

| | | | |
|---|---|---|---|
| 2014/0301338 A1 | 10/2014 | Zhong et al. | |
| 2015/0223235 A1 | 8/2015 | Hwang et al. | |
| 2016/0338041 A1 | 11/2016 | Li et al. | |
| 2017/0264401 A1 | 9/2017 | Soong et al. | |
| 2018/0020429 A1 | 1/2018 | Aiba et al. | |
| 2018/0132229 A1 | 5/2018 | Li | |
| 2018/0249458 A1 | 8/2018 | He et al. | |
| 2019/0052421 A1* | 2/2019 | Yin | H04L 5/0055 |
| 2019/0052422 A1* | 2/2019 | Yin | H04L 1/1829 |
| 2019/0239216 A1* | 8/2019 | Kundu | H04W 72/21 |
| 2019/0246416 A1 | 8/2019 | Park et al. | |
| 2019/0261361 A1* | 8/2019 | Xiong | H04W 72/02 |
| 2019/0261391 A1* | 8/2019 | Kundu | H04L 1/0073 |
| 2019/0327759 A1 | 10/2019 | Lee et al. | |
| 2020/0008225 A1 | 1/2020 | Lee et al. | |
| 2020/0022161 A1 | 1/2020 | Yang et al. | |
| 2020/0059327 A1* | 2/2020 | Kini | H04W 72/23 |
| 2020/0068557 A1 | 2/2020 | Lee et al. | |
| 2020/0136777 A1* | 4/2020 | He | H04L 5/0007 |
| 2020/0178263 A1 | 6/2020 | Shao | |
| 2020/0295882 A1 | 9/2020 | Wang et al. | |
| 2020/0351855 A1* | 11/2020 | Kung | H04L 1/1896 |
| 2020/0359372 A1 | 11/2020 | Du | |
| 2020/0367265 A1 | 11/2020 | Wang et al. | |
| 2020/0374048 A1* | 11/2020 | Lei | H04L 1/1896 |
| 2021/0218504 A1* | 7/2021 | Wang | H04L 1/1812 |
| 2021/0307046 A1 | 9/2021 | Gou et al. | |
| 2021/0368453 A1 | 11/2021 | Lee et al. | |
| 2021/0368528 A1 | 11/2021 | Yoshimura et al. | |
| 2022/0085925 A1* | 3/2022 | Gao | H04W 72/0446 |
| 2022/0094483 A1* | 3/2022 | Hosseini | H04L 1/1861 |
| 2022/0216951 A1* | 7/2022 | Chen | H04L 1/1854 |
| 2022/0295521 A1 | 9/2022 | Gou et al. | |
| 2022/0303977 A1* | 9/2022 | Saggar | H04L 5/0053 |
| 2023/0156685 A1* | 5/2023 | Zhang | H04L 5/0055 |
| | | | 370/329 |

FOREIGN PATENT DOCUMENTS

| | | | |
|---|---|---|---|
| CN | 107925532 A | 4/2018 | |
| CN | 108293242 A | 7/2018 | |
| CN | 108781446 A | 11/2018 | |
| CN | 109392126 A | 2/2019 | |
| CN | 109586877 A | 4/2019 | |
| CN | 109802819 A | 5/2019 | |
| CN | 109964434 A | 7/2019 | |
| CN | 109997327 A | 7/2019 | |
| CN | 110035544 A | 7/2019 | |
| CN | 110249689 A | 9/2019 | |
| CN | 110365456 A | 10/2019 | |
| CN | 110536464 A | 12/2019 | |
| CN | 110710318 A | 1/2020 | |
| CN | 110798291 A | 2/2020 | |
| CN | 110856265 A | 2/2020 | |
| CN | 110943815 A | 3/2020 | |
| WO | 2016/025836 A1 | 2/2016 | |
| WO | 2016/121457 A1 | 8/2016 | |
| WO | 2019/082157 A1 | 5/2019 | |
| WO | 2019/098697 A1 | 5/2019 | |
| WO | 2019/162929 A1 | 8/2019 | |
| WO | 2019/172624 A1 | 9/2019 | |
| WO | 2019/176914 A1 | 9/2019 | |

OTHER PUBLICATIONS

3GPP; TSG RAN; NR; Physical layer procedures for control (Release 16)', 3GPP TS 38.213 V16.1.0, Apr. 3, 2020, sections 9.1-9.2.1.

Review on Physical Layer Key Technology of 3GPP 5G NR, Oct. 15, 2018.

CATT, Correction on timeline definition for uplink physical channel overlapping, R1-1906298, 3GPP TSG-RAN WG1 Meeting #97, May 4, 2019, Reno, USA.

Ericsson, Maintenance issues of physical uplink control channel, R1-1809406, 3GPP TSG-RAN WG1 Meeting #94, Aug. 11, 2018, Gothenburg, Sweden.

Cellular LTE-A Internet-of-Things ; Physical Layer Features and Challenges, Jul. 18, 2017 IEEE Communications Surveys & Tutorials, vol. 19, No. 4, Fourth Quarter 2017.

Chinese Examination Report dated Apr. 25, 2024, issued in Chinese Application No. 202010276152.X.

Chinese Decision on Grant dated Aug. 30, 2024, issued in Chinese Application No. 202010276152.X.

European Communication pursuant to Article 94(3) EPC dated Jul. 23, 2025; European Appln. No. 21 785 498.3—1206.

European Communication pursuant to Article 94(3) EPC dated Feb. 11, 2026; European Appln. No. 21 785 498.3—1206.

Nokia et al.; Summary of Discussions on UL/DL Intra-UE Prioritization/ Multiplexing; 3GPP Tsg-Ran WG1 Ad-Hoc Meeting 1901; R1-1 901388; Taipei, Taiwan; Jan. 21-25, 2019; Jan. 23, 2019.

SONY; Considerations on intra-UE transmission multiplexing & prioritisation; 3GPP TSG RAN WG1 Ad-Hoc Meeting 1901; R1-1900376; Taipei, Taiwan; Jan. 21-25, 2019; Jan. 11, 2019.

3GPP; 5G; NR; Physical layer procedures for control (3GPP TS 38.213 version 15.5.0 Release 15); ETSI TS 138 213; V15.5.0; (May 2019); Sophia Antipolis Cedex, France; Mar. 28, 2019.

Korean Office Action with English translation dated Feb. 27, 2026; Korean Appln. No. 10-2022-7022419.

* cited by examiner

[Fig. 1]
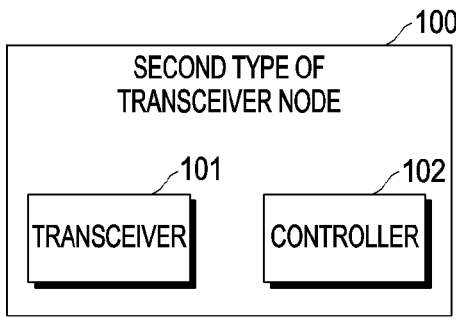
[Fig. 2]
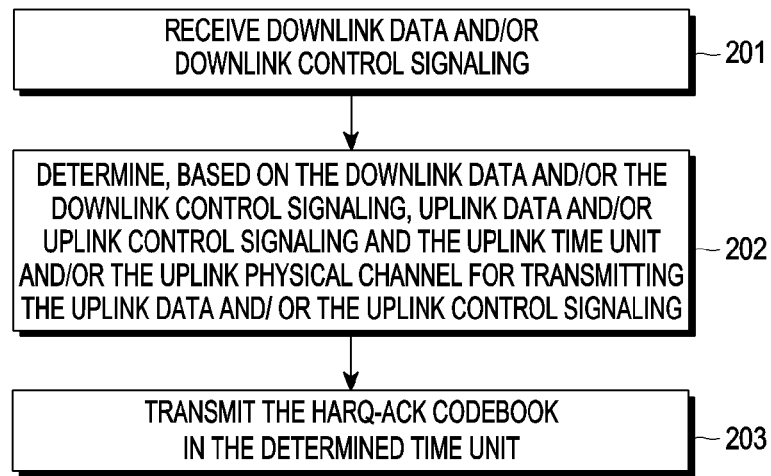
[Fig. 3]
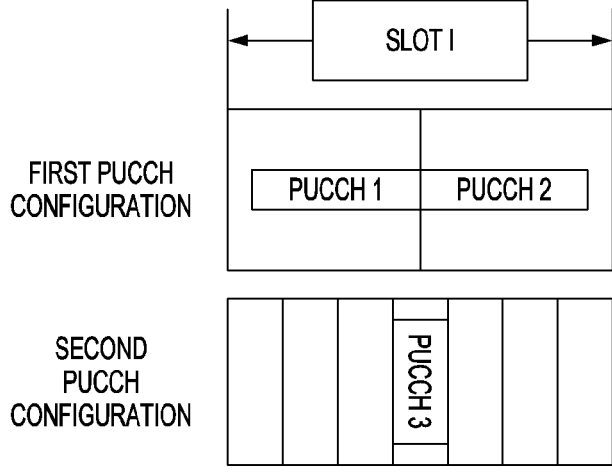

[Fig. 4]
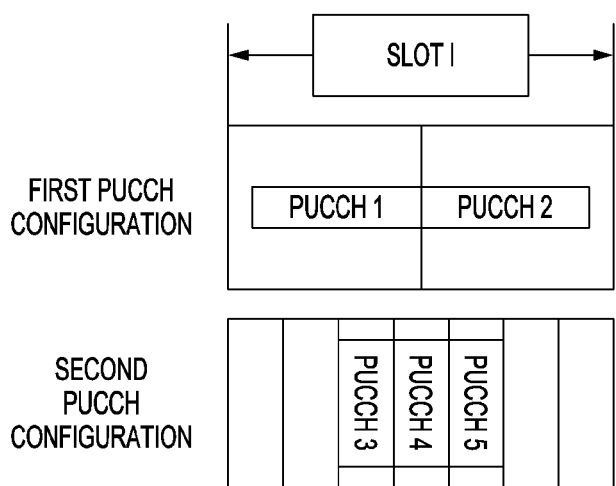
[Fig. 5]
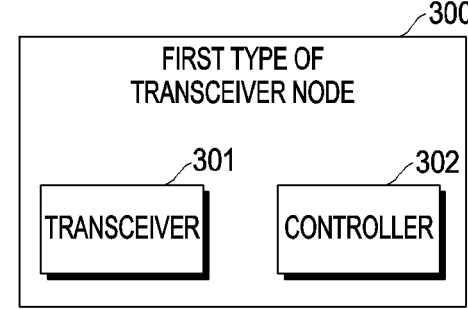
[Fig. 6]
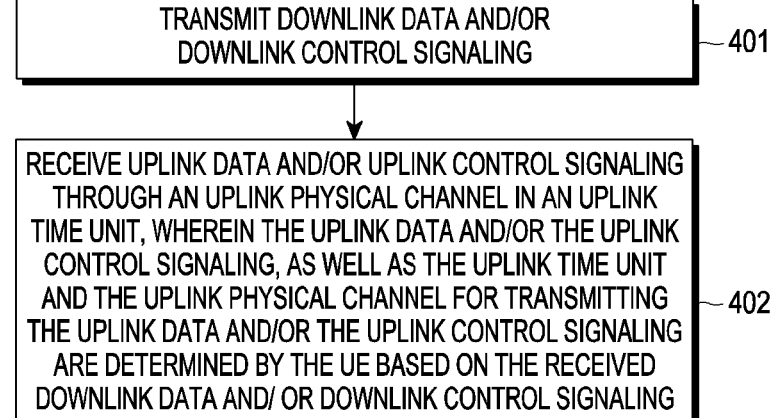

METHOD FOR TRANSMITTING UPLINK DATA AND CONTROL INFORMATION AND APPARATUS THEREOF

CROSS-REFERENCE TO RELATED APPLICATION(S)

This application is a U.S. National Stage application under 35 U.S.C. § 371 of an International application number PCT/KR2021/004353, filed on Apr. 7, 2021, which is based on and claims priority of a Chinese patent application number 202010276152.X, filed on Apr. 9, 2020, in the Chinese Intellectual Property Office, the disclosure of which is incorporated by reference herein in its entirety.

TECHNICAL FIELD

This present disclosure relates to wireless communication technology, and in particular, to a method for transmitting uplink data and control information and an apparatus thereof.

BACKGROUND ART

As the rapid development of the information industry, especially a growing demand from the mobile Internet and the Internet of Things (IoT), an unprecedented challenge has been brought to future mobile communication technologies. According to the report ITU-R M. [IMT.BEYOND 2020.TRAFFIC] of the International Telecommunication Union (ITU), it can be predicted that by 2020, the growth of mobile traffic will increase by nearly 1,000 times compared with 2010 (a 4G era), and the number of user equipment connections will also exceed 17 billion. As massive IoT devices gradually penetrate into mobile communication networks, the number of connected devices will be even more amazing. In order to deal with this unprecedented challenge, the communication industry and academia have launched extensive research on the 5th generation mobile communications technology (5G), facing the 2020s. At present, a framework and an overall objective of the future 5G have already been discussed in the report ITU-R M. [IMT.VISION] of ITU, in which outlook for demands, application scenarios and various important performance indicators of 5G are described in detail. In response to new demands in 5G, ITU's report ITU-R M. [IMT.FUTURE TECHNOLOGY TRENDS] provides information on technology trends of 5G, and aims to address significant issues such as significant improvements in system throughput, consistency of user experience, scalability to support IoT, delay, energy efficiency, cost, network flexibility, support for emerging services, flexible spectrum utilization and the like. In 3GPP, the first phase of work on 5G is already underway. In order to support more flexible scheduling, 3GPP decided to support variable Hybrid Automatic Repeat Request-Acknowledgement (HARQ-ACK) feedback delay in 5G. In the existing Long Term Evolution (LTE) system, the time from the downlink reception of data to the uplink transmission of HARQ-ACK is fixed. For example, in a Frequency Division Duplex (FDD) system, the delay is 4 subframes, and in a Time Division Duplex (TDD) system, the delay can be greater than 4 subframes. According to uplink and downlink configuration, a HARQ-ACK feedback delay is determined for corresponding downlink subframes. In a 5G system, regardless of an FDD system or a TDD system, for a specific downlink time unit (for example, a downlink slot or a downlink mini-slot), an uplink time unit in which HARQ- ACK can be fed back is variable. For example, the HARQ-ACK feedback delay can be dynamically indicated through physical layer signaling, or different HARQ-ACK delays can be determined based on factors such as different services or user capabilities.

DISCLOSURE OF INVENTION

Solution to Problem

The present invention is provided to solve at least the above problems, and at least the following advantages are provided.

According to an aspect of the present invention, a method performed by a second type of transceiver node in a wireless communication system is provided, comprising: receiving downlink data and/or downlink control signaling from a first type of transceiver node; determining an uplink data and/or an uplink control signaling, as well as an uplink time unit and an uplink physical channel for transmitting the uplink data and/or the uplink control signaling based on the downlink data and/or the downlink control signaling; and transmitting the uplink data and/or the uplink control signaling to the first type of transceiver node through the uplink physical channel in the determined uplink time unit.

Optionally, the second type of transceiver node is configured with two priorities: a low first priority and a high second priority, and two physical uplink control channel (PUCCH) configurations: a first PUCCH configuration and a second PUCCH configuration, and each PUCCH configuration has one of the low first priority and the high second priority, wherein the first priority being lower than the second priority.

Optionally, when PUCCHs of different PUCCH configurations overlap in the time domain, one PUCCH is selected from the PUCCHs that overlap in the time domain for transmission based on one or more of a PUCCH sub-slot length, a PUCCH priority, an uplink control information (UCI) type carried by the PUCCH, a higher layer signaling configuration, and a downlink control information (DCI) indication.

Optionally, when PUCCHs of different PUCCH configurations overlap in the time domain, more than one PUCCH is selected from the PUCCHs that overlap in the time domain based on one or more of a PUCCH sub-slot length, a PUCCH priority, a UCI type carried by the PUCCH, a higher layer signaling configuration, a DCI indication, and a timeline, UCI information carried by the more than one PUCCH is multiplexed, and then a new PUCCH is selected to transmit the multiplexed UCI.

Optionally, UCI included in the multiplexed UCI information is sorted based on different priorities and/or types of the UCI according to one or more of the standard specifications, the higher layer signaling configuration, and the DCI indication.

Optionally, for the PUCCHs that overlap in the time domain, when one PUCCH with the low first priority and multiple PUCCHs with the high second priority overlap in the time domain, and one of the multiple PUCCHs with the high second priority and multiple PUCCHs with the low first priority overlap in the time domain, or when multiple PUCCHs with a same priority overlap in the time domain, how to multiplex different types of UCI carried by PUCCHs with different or same priorities is determined according to one or more of the standards specifications, the higher layer signaling configuration, the DCI indication, and a UCI type carried by the PUCCH, and then the new PUCCHs that do not overlap in the time domain are selected to transmit the multiplexed UCI.

Optionally, the determining how to multiplex different types of UCI carried by PUCCHs with different or same priorities, and then selecting the new PUCCH that do not overlap in the time domain to transmit the multiplexed UCI includes the following steps:

step 0: forming a set Z by PUCCHs in one slot that satisfy the timeline, sorting the PUCCHs in the set Z according to one or more of the standards specifications, the higher layer signaling configuration, and the DCI indication based on one or more of a starting OFDM symbol, duration, and a priority of the PUCCH in the set Z, and the type of UCI information carried by the PUCCH in the set Z, and deleting a PUCCH that does not satisfy a multiplexing condition from the set Z;

step 1: selecting the first PUCCH in the set Z in order of time sequences; determining whether the first PUCCH overlaps with other PUCCH(s) in the time domain; if there is no overlap, selecting a next PUCCH in the set Z as the first PUCCH in order of time sequences, and continuing to perform the above determining; or if there is overlap, when a number of PUCCHs that overlap with the first PUCCH in the time domain is equal to 1, selecting a PUCCH that overlaps with the first PUCCH in the time domain; or when the number of PUCCHs that overlap with the first PUCCH in the time domain is greater than 1, selecting a first PUCCH thereof in order of time sequences, or selecting all PUCCHs that overlap with the first PUCCH in the time domain; multiplexing UCI carried by the selected PUCCH into a new UCI and reselecting a new PUCCH; deleting the selected PUCCH(s) from the set Z; adding the new PUCCH into the set Z; and re-sorting the PUCCHs in the set Z according to the rule of step 0; and step 2: deleting PUCCH(s) that do(es) not satisfy the multiplexing condition from the set Z according to a predetermined rule; and repeating step 1 until all PUCCHs in the set Z do not overlap in the time domain, or the number of PUCCHs in the set Z is 1.

Optionally, in the case where a PUCCH that carries one or more of scheduling request (SR), link recovery request (LLR), and channel state information (CSI) overlaps in the time domain with multiple PUCCHs that carry hybrid automatic repeat request-acknowledgement (HARQ-ACK) information, when the HARQ-ACK information is a HARQ-ACK codebook of a semi-persistent scheduling (SPS) physical downlink shared channel (PDSCH) without DCI scheduling, a number of bits of the HARQ-ACK information is greater than 2, one or more of the SR, the LLR, and the CSI are multiplexed with a first piece of HARQ-ACK information that overlaps in the time domain in order of time sequences, and then the multiplexed UCI is transmitted through a PUCCH resource for a HARQ-ACK of the SPS PDSCH.

Optionally, in the case where the second type of transceiver node is configured with PUCCH resources for SR and LRR, when a PUCCH carrying SR and a PUCCH carrying LRR overlap in the time domain, the second type of transceiver node transmits the PUCCH carrying LRR instead of the PUCCH carrying SR; or the second type of transceiver node multiplexes the SR and the LRR, and then reselects a PUCCH resource to transmit the multiplexed SR and LRR.

Optionally, when a PUCCH carrying LRR and a physical uplink shared channel (PUSCH) overlap in the time domain, the second type of transceiver node transmits the PUCCH carrying LRR instead of the PUSCH; or the second type of transceiver node multiplexes the LRR information onto the PUSCH, and then transmits the PUSCH.

Optionally, in the case where the second type of transceiver node is configured with a configured grant PUSCH resource, when the configured grant PUSCH resource and a PUCCH carrying HARQ-ACK information overlap in the time domain and the HARQ-ACK information is carried by another PUSCH, if the configured grant PUSCH and the another PUSCH do not overlap in the time domain, and the configured grant PUSCH satisfies a timeline or the another PUSCH is not scheduled, the configured grant PUSCH and the another PUSCH are transmitted.

Optionally, in the case where the configured grant PUSCH satisfies the timeline, if the another PUSCH is scheduled by DCI, a distance between a starting position of the first OFDM symbol of the configured grant PUSCH and an ending position of a last OFDM symbol of the DCI scheduling the another PUSCH is less than N OFDM symbols or slots or sub-slots, where N is one of 0, a decimal, and an integer.

According to an aspect of the present invention, a second type of transceiver node in a wireless communication system is provided, comprising: a transceiver configured to: receive downlink data and/or downlink control signaling from a first type of transceiver node; and transmit uplink data and/or uplink control signaling to the first type of transceiver node through an uplink physical channel in an uplink time unit; a controller configured to control an overall operation of the second type of transceiver node, including: determining the uplink data and/or the uplink control signaling, as well as the uplink time unit and the uplink physical channel for transmitting the uplink data and/or the uplink control signaling based on the downlink data and/or the downlink control signaling; and controlling the transceiver to transmit the uplink data and/or the uplink control signaling to the first type of transceiver node through the uplink physical channel in the determined uplink time unit.

According to an aspect of the present invention, a method performed by a first type of transceiver node in a wireless communication system is provided, comprising: transmitting a downlink data and/or a downlink control signaling to a second type of transceiver node; and receiving an uplink data and/or an uplink control signaling from the second type of transceiver node through an uplink physical channel in an uplink time unit; wherein the uplink data and/or the uplink control signaling, as well as the uplink time unit and the uplink physical channel for transmitting the uplink data and/or the uplink control signaling are determined by the second type of transceiver node based on the received downlink data and/or downlink control signaling.

According to an aspect of the present invention, a first type of transceiver node in a wireless communication system is provided, the first type of transceiver node comprising: a transceiver configured to transmit a downlink data and/or a downlink control signaling to a second type of transceiver node and receive an uplink data and/or an uplink control signaling from the second type of transceiver node through an uplink physical channel in an uplink time unit; and a controller configured to control an overall operation of the first type of transceiver node, including: controlling the transceiver to transmit the downlink data and/or the downlink control signaling to the second type of transceiver node and receive the uplink data and/or the uplink control signaling from the second type of transceiver node through the uplink physical channel in the uplink time unit;

wherein the uplink data and/or the uplink control signaling, as well as and the uplink time unit and the uplink physical channel for transmitting the uplink data and/or the uplink control signaling are determined by the second type of transceiver node based on the received downlink data and/or downlink control signaling.

According to an aspect of the present invention, A method performed by a user equipment (UE) in a wireless communication system, the method comprising: receiving, from a base station, first information associated with a physical uplink control channel (PUCCH) resource associated with hybrid automatic request—acknowledgement (HARQ-ACK); receiving, from the base station, a physical downlink shared channel (PDSCH); identifying a PUCCH resource based on second information associated with HARQ-ACK which is obtained from the first information, and third information associated with uplink control information (UCI); transmitting, to the base station, HARQ-ACK information for the PDSCH and at least one scheduling request (SR) via the identified PUCCH resource.

Optionally, the third information includes a number of UCI information bits.

Optionally, the number of the UCI information bits is greater than 2.

Optionally, the at least one SR and the HARQ-ACK information are transmitted simultaneously.

Optionally, the UCI information bits include HARQ-ACK information bits.

According to an aspect of the present invention, A method performed by a base station in a wireless communication system, the method comprising: transmitting, to a user equipment (UE), first information associated with a physical uplink control channel (PUCCH) resource associated with hybrid automatic request—acknowledgement (HARQ-ACK); transmitting, to the UE, a physical downlink shared channel (PDSCH); receiving, from the UE, HARQ-ACK information for the PDSCH and at least one scheduling request (SR) via the PUCCH resource, wherein the PUCCH resource is identified based on second information associated with HARQ-ACK which is obtained from the first information, and third information associated with uplink control information (UCI).

Optionally, the third information includes a number of UCI information bits.

Optionally, the number of the UCI information bits is greater than 2.

Optionally, the at least one SR and the HARQ-ACK information are transmitted simultaneously.

Optionally, the UCI information bits include HARQ-ACK information bits.

According to an aspect of the present invention, A user equipment (UE) in a wireless communication system, comprising: a transceiver; and at least one processor coupled to the transceiver; wherein the at least one processor is configured to: receive, from a base station, first information associated with a physical uplink control channel (PUCCH) resource associated with hybrid automatic request—acknowledgement (HARQ-ACK), receive, from the base station, physical downlink shared channel (PDSCH), identify a PUCCH resource based on second information associated with HARQ-ACK which is obtained from the first information, and third information associated with uplink control information (UCI), transmit, to the base station, HARQ-ACK information for the PDSCH and scheduling request (SR) via the identified PUCCH resource.

Optionally, the third information includes a number of UCI information bits.

Optionally, the number of the UCI information bits is greater than 2.

Optionally, the at least one SR and the HARQ-ACK information are transmitted simultaneously, or wherein the UCI information bits include HARQ-ACK information bits.

According to an aspect of the present invention, A base station in a wireless communication system, comprising: a transceiver; and at least one processor coupled to the transceiver; wherein the at least one processor is configured to: transmit, to a user equipment (UE), first information associated with a physical uplink control channel (PUCCH) resource associated with hybrid automatic request—acknowledgement (HARQ-ACK), transmit, to the UE, physical downlink shared channel (PDSCH), receive, from the UE, HARQ-ACK information for the PDSCH and at least one scheduling request (SR) via the PUCCH resource, wherein the PUCCH resource is identified based on second information associated with HARQ-ACK which is obtained from the first information, and third information associated with uplink control information (UCI).

Various embodiments of the present disclosure provide the methods and apparatuses for efficient transmission in the wireless communication system.

Further, according to the present invention, when the PUCCH with the first priority and the PUCCH with the second priority collide in the time domain, PUCCH resources for transmission may be selected based on a sub-slot configuration with the first priority and/or a sub-slot configuration with the second priority, to ensure efficient utilization of uplink control channel resources.

BRIEF DESCRIPTION OF DRAWINGS

The above and additional aspects and advantages of the present disclosure will become more apparent and easy to understand with the following description in conjunction with the accompanying drawings, in which:

FIG. 1 shows a block diagram of a second type of transceiver node according to an embodiment of the present disclosure;

FIG. 2 shows a flowchart of a method performed by UE according to an embodiment of the present disclosure;

FIG. 3 shows multiple PUCCH configurations according to an embodiment of the present disclosure;

FIG. 4 shows multiple PUCCH configurations according to another embodiment of the present disclosure;

FIG. 5 is a block diagram of a first type of transceiver node according to an embodiment of the present disclosure; and FIG. 6 is a flowchart of a method performed by a base station according to an embodiment of the present disclosure;

MODE FOR THE INVENTION

The embodiments of this application are described below in detail, examples of which are shown in the accompanying drawings, wherein, throughout, the same or similar reference numerals represent the same or similar elements or elements having the same or similar functions. The embodiments described below with reference to the accompanying drawings are exemplary and only used to explain this application, and cannot be construed as a limitation on this application.

Those skilled in the art can understand that singular forms of "a", "an", "said" and "the" used herein may also include plural forms, unless specifically stated. It should be further understood that the word "comprise" used in the specification of this application refers to the presence of the described features, integers, steps, operations, elements and/or components, but does not exclude the presence or addition of one or more other features, integers, steps, operations, elements, components, and/or groups thereof.

Those skilled in the art can understand that, all terms (including technical terms and scientific terms) used herein have the same meaning as those generally understood by those of ordinary skill in the art to which this disclosure belongs, unless otherwise defined. It should also be understood that the terms such as those defined in a general dictionary should be understood to have meanings consistent with those in the context of the prior art, and will not be interpreted with idealized or excessively formal meanings, unless specifically defined as herein.

Those skilled in the art can understand that "a terminal" or "a terminal device" used herein includes both devices of wireless signal receivers, including only devices of wireless signal receivers without transmission capability, and also hardware devices for reception and transmission, including hardware devices for reception and transmission capable of two-way communication on two-way communication links. Such devices may include: cellular or other communication devices with single-line displays or multi-line displays, or cellular or other communication devices without multi-line displays; PCSs (personal communication systems), which may combine voice, data processing, fax and/or data communication capabilities; PDAs (personal digital assistants), which may include radio frequency receivers, pagers, Internet/Intranet access, web browsers, notepads, calendars and/or GPS (Global Positioning System) receivers; conventional laptop and/or palmtop computers or other devices, which have and/or include conventional laptop and/or palmtop computers or other devices with radio frequency receivers. The "terminal" or "terminal device" used herein may be portable, transportable, installed in vehicles (aerial, marine, and/or terrestrial), or suitable and/or configured to operate locally, and/or operate at any other location of the earth and/or space in a distributed form. The "terminal" or "terminal device" used herein may also be a communication terminal, an Internet terminal, a music/video playback terminal, for example, a PDA, a MID (mobile Internet device) and/or a mobile phone with music/video playback functions, as well as devices such as a smart TV, a set-top box, and the like.

3GPP defines three major directions of 5G application scenarios: eMBB (enhanced mobile broadband), mMTC (large-scale Internet of Things, more often referred to as massive machine-type communication), and URLLC (ultra-reliable low-latency communication). The eMBB scenario is a further improvement in performance such as user experience on the basis of an existing mobile broadband service scenario, and is mainly in pursuit of ultimate communication experience between people. mMTC and URLLC are application scenarios of the Internet of Things, but their respective focuses are different: mMTC is mainly for information exchange between people and things, while URLLC mainly reflects communication requirements between things. Joint networking will be used for eMBB and URLLC in 5G, and both a URLLC service and an eMBB service are supported in a same cell. Since the URLLC service may be a sparse service, joint networking for eMBB and URLLC can improve system spectral efficiency compared with separate networking for URLLC. When there is a URLLC service in a system, the URLLC service is preferentially scheduled. When there is no URLLC service in a system or a URLLC service occupies few resources, an eMBB service can be scheduled. At present, when the URLLC service and the eMBB service conflict, data and/or control information of the URLLC service will be preferentially transmitted. In this case, performance of the eMBB service will degrade. How to optimize transmission of data and control information of an eMBB service needs an urgent solution.

Various embodiments of this application will be described below in detail with reference to the accompanying drawings.

FIG. 1 shows a block diagram of a second type of transceiver node according to an embodiment of the present invention.

Referring to FIG. 1, the second type of transceiver node 100 may include a transceiver 101 and a controller 102.

The transceiver 101 may be configured to receive a first type of data and/or a first type of control signaling from a first type of transceiver node and transmit a second type of data and/or a second type of control signaling to the first type of transceiver node in a determined time unit.

The controller 102 may be a circuit-specific integrated circuit or at least one processor. The controller 102 may be configured to control an overall operation of the second type of transceiver node, and control the second type of transceiver node to implement the method proposed in the present invention. Specifically, the controller 102 may be configured to determine, based on the first type of data and/or the first type of control signaling, the second type of data and/or the second type of control signaling and a second type of time unit and a second type of physical channel for transmitting the second type of data and/or the second type of control signaling, and control the transceiver 101 to transmit uplink data and/or uplink control signaling to the first type of transceiver node over the second type of physical channel in the determined second type of time unit.

In the present invention, the first type of transceiver node may be a BS (Base Station), and the second type of transceiver node may be a UE (User Equipment). In the following examples, a base station is taken as an example (rather than a limitation) to describe the first type of transceiver node, and UE is taken as an example (rather than a limitation) to describe the second type of transceiver node.

The first type of data may be data transmitted by the first type of transceiver node to the second type of transceiver node. In the following examples, downlink data carried by the PDSCH (Physical Downlink Shared Channel) is taken as an example (rather than a limitation) to describe the first type of data.

The second type of data may be data transmitted by the second type of transceiver node to the first type of transceiver node. In the following examples, a PUSCH (Physical Uplink Shared Channel) is taken as an example (rather than a limitation) to describe the second type of data.

The first type of control signaling may be control signaling transmitted by the first type of transceiver node to the second type of transceiver node. In the following examples, downlink control signaling is taken as an example (rather than a limitation) to describe the first type of control signaling. The downlink control signaling may be DCI (downlink control information) carried by a PDCCH (physical downlink control channel) and/or control signaling carried by a PDSCH (physical downlink shared channel).

The second type of control signaling may be control signaling transmitted by the second type of transceiver node to the first type of transceiver node. In the following examples, uplink control signaling is taken as an example (rather than a limitation) to describe the second type of control signaling. The uplink control signaling may be UCI (Uplink Control Information) carried by the PUCCH (Physical Uplink Control Channel) and/or control signaling carried by the PUSCH (Physical Uplink Shared Channel). Types of the UCI may include HARQ-ACK information, SR (Scheduling Request), LRR (Link Recovery Request), and CSI (Channel State Information).

The first type of time unit is a time unit wherein the first type of transceiver node transmits the first type of data and/or the first type of control signaling. In the following examples, a downlink time unit is taken as an example (rather than a limitation) to describe the first type of time unit.

The second type of time unit is a time unit, wherein the second type of transceiver node transmits the second type of data and/or the second type of control signaling. In the following examples, an uplink time unit is taken as an example (rather than a limitation) to describe the second type of time unit.

The first type of time unit and the second type of time unit may be one or more slots, one or more sub-slots, one or more OFDM (Orthogonal Frequency Division Multiplexing) symbols, and one or more subframes.

Depending on a network type, the term "base station" or "BS" may refer to any component (or set of components) configured to provide wireless access to the network, such as a transmission point (TP), a transmission-reception point (TRP), an enhanced base station (eNodeB or eNB), a 5G base station (gNB), a macro cell, a femto cell, a Wi-Fi access point (AP) or other wirelessly enabled devices. The base station may provide wireless access based on one or more wireless communication standard specifications, for example, 5G 3GPP New Radio Interface/Access (NR), Long Term Evolution (LTE), Advanced LTE (LTE-A), High Speed Packet Access (HSPA), Wi-Fi 802.11a/b/g/n/ac, etc. For convenience, the terms "BS" and "TRP" may be used interchangeably in this patent document to refer to network infrastructure components that provide wireless access to remote terminals. In addition, depending on the network type, the term "user equipment" or "UE" may refer to any of the following components, such as a "mobile station", a "subscriber station", a "remote terminal", a "wireless terminal", a "reception point", "user equipment", or simply a "terminal". For convenience, the term "user equipment" or "UE" is used in this patent document to refer to a remote wireless device that wirelessly accesses the BS, whether the UE is a mobile device (such as a mobile phone or a smartphone), or a general considered fixed equipment (for example, a desktop computer or a vending machine) in a general sense.

FIG. 2 is a flowchart of a method performed by UE according to an embodiment of the present invention.

First, at step 201, the UE receives downlink data and/or downlink control signaling from the base station.

At step 202, the UE determines, based on the downlink data and/or the downlink control signaling, uplink data and/or uplink control signaling, as well as the uplink time unit and/or the uplink physical channel for transmitting the uplink data and/or the uplink control signaling.

At step 203, the UE transmits the uplink data and/or the uplink control signaling to the base station through the uplink physical channel in the determined uplink time unit.

According to an embodiment of the present invention, the UE may be configured with two priorities: priority 0 and priority 1. Priority 1 is higher than priority 0.

The UE can be configured with two PUCCH configurations: first PUCCH configuration and second PUCCH configuration, wherein the first PUCCH configuration can be the first one of the two PUCCH configurations configured for the UE, and the second PUCCH configuration can be the second one of the two PUCCH configurations configured for the UE. The priority of the first PUCCH configuration can be priority 0. The priority of the second PUCCH configuration can be priority 1. The priority of a PUCCH is the same as the priority of a PUCCH configuration to which this PUCCH belongs.

FIG. 3 shows multiple PUCCH configurations according to an embodiment of the present invention.

As shown in FIG. 3, each slot (for example, slot i) includes 14 OFDM symbols. The length of sub-slot configuration of the first PUCCH configuration can be of 7 OFDM symbols (for example, PUCCH 1-1 and PUCCH 1-2 each includes 7 OFDM symbols), and the length of sub-slot of the second PUCCH configuration can be of 2 OFDM symbols (for example, PUCCH 2-3 includes 2 OFDM symbols). A PUCCH of the second PUCCH configuration, for example, PUCCH 3, can overlap with multiple PUCCHs (for example, PUCCH 1 and PUCCH 2) of the first PUCCH configuration in time domain. In this embodiment, a number of PUCCHs that are transmitted simultaneously at an occasion is 1. In this case, one of the PUCCHs can be selected for transmission, or after UCI information carried by the PUCCHs being multiplexed, a new PUCCH can be selected for transmission.

Optionally, one PUCCH can be selected from the PUCCHs that overlap in the time domain for transmission according to one or more of the sub-slot length of PUCCH, the priority of PUCCH, the type of UCI carried by PUCCH, the higher layer signaling configuration, and DCI indication.

For example, PUCCH 1 is with priority 0, and the UCI carried by PUCCH 1 is HARQ-ACK; PUCCH 3 is with priority 1, and the UCI carried by PUCCH 3 is CSI. In this case, PUCCH 1 instead of PUCCH 3 is transmitted. Further, PUCCH 2 may also be transmitted.

For another example, PUCCH 1 is with priority 0, and UCI carried by PUCCH 1 is CSI; PUCCH 3 is with priority 1, and the UCI carried by PUCCH 3 is HARQ-ACK. In this case, PUCCH 3 instead of PUCCH 1 is transmitted. Further, because PUCCH 3 overlaps with PUCCH 2 in the time domain, PUCCH 2 is not transmitted either.

Optionally, according to one or more of the sub-slot length of PUCCH, the priority of PUCCH, the type of UCI carried by PUCCH, the higher layer signaling configuration, and DCI indication, when a timeline is satisfied, one or more PUCCHs can be selected from the PUCCHs that overlap in the time domain, UCI information carried by the one or more PUCCHs are multiplexed, and then a new PUCCH is selected to transmit the multiplexed UCI.

When a number of selected PUCCHs is greater than 1, UCI information carried by the selected PUCCHs need to be multiplexed, and then a new PUCCH is selected to carry the multiplexed UCI information.

Optionally, according to the standard specifications, the higher layer signaling configuration, and DCI indication, when a PUCCH with a lower priority overlaps with multiple PUCCHs with higher priority in the time domain, when a timeline is satisfied, UCI carried by the PUCCH with low priority can be multiplexed with UCI carried by a first PUCCH with higher priority in order of time sequences, and a PUCCH resource of the second PUCCH configuration (the PUCCH resource with higher priority) is used to carry the multiplexed UCI, or a PUCCH resource of the first PUCCH configuration (the PUCCH resource with lower priority) is used to carry the multiplexed UCI.

Alternatively, according to one or more of the standard specifications, the higher layer signaling configuration, and DCI indication, when one PUCCH with lower priority overlaps with multiple PUCCHs with higher priority in the time domain, when a timeline is satisfied, UCI carried by the one PUCCH with lower priority can be multiplexed with UCI carried by all PUCCHs with higher priority in order of time sequences based on one or more of standard specifications, a higher layer signaling configuration, and a DCI indication, and a PUCCH resource of the second PUCCH configuration (the PUCCH resource with higher priority) is used to carry the multiplexed UCI, or a PUCCH resource of the first PUCCH configuration (the PUCCH resource with lower priority) is used to carry the multiplexed UCI.

Optionally, when the PUCCH carrying the multiplexed UCI overlaps with other PUCCH(s) with higher priority in the time domain, the PUCCH carrying the multiplexed UCI is transmitted instead of the other PUCCH(s) with higher priority that overlap in the time domain with the PUCCH carrying the multiplexed UCI.

Optionally, when the PUCCH carrying the multiplexed UCI overlaps with other PUCCH(s) with higher priority in the time domain, the multiplexed UCI can be multiplexed with UCIs carried by the other PUCCH(s) with higher priority.

Optionally, the PUCCHs with higher priority which are multiplexed with UCI carried by the PUCCH with lower priority can be determined based on the types of UCIs carried by the PUCCHs with higher priority. For example, when the types of UCIs carried by multiple PUCCHs with higher priority are the same, the UCI carried by a first PUCCH with higher priority in order of time sequences is selected to be multiplexed with the UCI carried by the PUCCH with lower priority. When the types of UCIs carried by multiple PUCCHs with higher priority are different from each other, the UCIs carried by all the PUCCHs with higher priority are selected to be multiplexed with the UCI carried by the PUCCH with lower priority.

Alternatively, for each type of the UCIs carried by different PUCCHs with higher priority, the UCI carried by a first PUCCH with higher priority in order of time sequences is selected to be multiplexed with the UCI carried by the PUCCH with lower priority.

Optionally, according to one or more of the standard specifications, the higher layer signaling configuration, and DCI indication, when one PUCCH with higher priority overlaps with multiple PUCCHs with lower priority in the time domain, when a timeline is satisfied, the UCI carried by the PUCCH with higher priority can be multiplexed with UCI carried by a first PUCCH with lower priority in order of time sequences, and a PUCCH resource of the second PUCCH configuration (the PUCCH resource with higher priority) is used to carry the multiplexed UCI, or a PUCCH resource of the first PUCCH configuration (the PUCCH resource with lower priority) is used to carry the multiplexed UCI.

Alternatively, according to one or more of the standard specifications, the higher layer signaling configuration, and DCI indication, when a PUCCH with higher priority overlaps with multiple PUCCHs with lower priority in the time domain, when a timeline is satisfied, the UCI carried by the PUCCH with higher priority can be multiplexed with the UCIs carried by all PUCCHs with lower priority in order of time sequences, and a PUCCH resource of the second PUCCH configuration (the PUCCH resource with higher priority) is used to carry the multiplexed UCI, or a PUCCH resource of a first PUCCH configuration (the PUCCH resource with lower priority) is used to carry the multiplexed UCI.

Optionally, when the PUCCH carrying the multiplexed UCI overlaps with other PUCCH(s) with lower priority in the time domain, the PUCCH carrying the multiplexed UCI is transmitted instead of the other PUCCH(s) with lower priority that overlap in the time domain with the PUCCH carrying the multiplexed UCI.

Optionally, according to one or more of the standard specifications, the higher layer signaling configuration, and DCI indication, the timeline satisfied by the PUCCHs to be multiplexed can be determined based on the priority and/or the PUCCH configuration of the PUCCH carrying the multiplexed UCI information.

Optionally, the PUCCH(s) with lower priority to be multiplexed with the UCI carried by the PUCCH with higher priority can be determined based on the types of UCIs carried by the PUCCHs with lower priority. For example, when the types of UCIs carried by the multiple PUCCHs with lower priority are the same, the UCI carried by a first PUCCH with lower priority in order of time sequences is selected to be multiplexed with the UCI carried by the PUCCH with higher priority. When the types of UCIs carried by the multiple PUCCHs with lower priority are different from each other, the UCIs carried by all the PUCCHs with lower priority are selected to be multiplexed with the UCI carried by the PUCCH with higher priority.

Alternatively, for each type of UCI carried by different PUCCHs with lower priority, the UCI carried by a first PUCCH with lower priority in order of time sequences is selected to be multiplexed with the UCI carried by the PUCCH with higher priority.

This method specifies how to multiplex UCI information carried by PUCCHs when multiple PUCCHs with different priorities overlap in the time domain. This method clarifies behavior of the UE, which ensures a consistent understanding of the PUCCH resource and the UCI information carried by the PUCCH between the UE and the base station, improves reliability of the PUCCH transmission, and improves network spectral efficiency. In addition, this method can further reduce a transmission delay of the UCI. Scheduling flexibility is improved by configuration.

Optionally, according to one or more of the standard specifications, the higher layer signaling configuration, and DCI indication, UCIs with different priorities and types included in the multiplexed UCI information can be sorted as follows: UCI with priority 1 comes before UCI with priority 0, or UCI with priority 0 comes before UCI with priority 1. Different types of UCI included in the UCI with priority 0 and/or priority 1 are sorted in turn as HARQ-ACK, SR/LRR, and CSI; or SR/LRR, HARQ-ACK, and CSI; or HARQ-ACK, SR, LRR and CSI; or HARQ-ACK, LRR, SR, and CSI.

Optionally, a HARQ-ACK with priority 0 can include HARQ-ACK codebooks carried by multiple PUCCHs. In this case, the HARQ-ACK information with priority 0 is sorted in order of time sequences of PUCCHs. Optionally, a HARQ-ACK with priority 1 can include HARQ-ACK codebooks carried by multiple PUCCHs. In this case, the HARQ-ACK information with priority 1 is sorted in order of time sequences of PUCCHs.

Optionally, according to one or more of the standard specifications, the higher layer signaling configuration, and DCI indication, UCIs included in the multiplexed UCI information can be sorted based on different priorities and/or types of the UCIs. For example, different priorities and types of UCIs included in the multiplexed UCI information are sorted in turn as follows: HARQ-ACK with priority 1, HARQ-ACK with priority 0, SR/LRR with priority 1, SR/LRR with priority 0, CSI with priority 1, and CSI with priority 0. Alternatively, different priorities and types of UCIs included in the multiplexed UCI information are sorted in turn as follows: HARQ-ACK with priority 0, HARQ-ACK with priority 1, SR/LRR with priority 0, SR/LRR with priority 1, CSI with priority 0, and CSI with priority 1. Alternatively, different priorities and types of UCIs included in the multiplexed UCI information are sorted in turn as follows: HARQ-ACK with priority 0, HARQ-ACK with priority 1, SR with priority 0, SR with priority 1, LRR with priority 0, LRR with priority 1, CSI with priority 0, and CSI with priority 1. Alternatively, different priorities and types of UCIs included in the multiplexed UCI information are sorted in turn as follows: HARQ-ACK with priority 1, HARQ-ACK with priority 0, SR with priority 1, SR with priority 0, LRR with priority 1, LRR with priority 0, CSI with priority 1, and CSI with priority 0. Alternatively, different priorities and types of UCIs included in the multiplexed UCI information are sorted in turn as follows: HARQ-ACK with priority 0, HARQ-ACK with priority 1, LRR with priority 0, LRR with priority 1, SR with priority 0, SR with priority 1, CSI with priority 0, and CSI with priority 1. Alternatively, different priorities and types of UCIs included in the multiplexed UCI information are sorted in turn as follows: HARQ-ACK with priority 1, HARQ-ACK with priority 0, LRR with priority 1, LRR with priority 0, SR with priority 1, SR with priority 0, CSI with priority 1, and CSI with priority 0.

Optionally, a HARQ-ACK with priority 0 can include HARQ-ACK codebooks carried by multiple PUCCHs. In this case, the HARQ-ACK information with priority 0 is sorted in order of time sequences of PUCCHs. Optionally, a HARQ-ACK with priority 1 can include HARQ-ACK codebooks carried by multiple PUCCHs. In this case, the HARQ-ACK information with priority 1 is sorted in order of time sequences of PUCCHs.

It should be noted that the higher priority in this embodiment refers to priority 1, and the lower priority refers to priority 0.

This method specifies how to sort different priorities and types of UCIs information included in multiplexed UCI. This method clarifies behavior of the UE, which ensures a consistent understanding of the PUCCH resource and the UCI information carried by the PUCCH between the UE and the base station, improves reliability of the PUCCH transmission, and improves network spectral efficiency. In addition, this method can further reduce a transmission delay of the UCI. Scheduling flexibility is improved by configuration.

When one PUCCH with lower priority and multiple PUCCHs with higher priority overlap in the time domain, and one of the multiple PUCCHs with higher priority and multiple PUCCHs with lower priority overlap in the time domain, UCIs carried by the PUCCHs have to be multiplexed or PUCCH(s) need to be dropped, then PUCCHs that do not overlap in the time domain are selected for transmission.

FIG. 4 shows multiple PUCCH configurations according to another embodiment of the present invention.

As shown in FIG. 4, PUCCH 1 and PUCCH 2 are with priority 0. PUCCH 3, PUCCH 4, and PUCCH 5 are with priority 1. PUCCH 1 overlaps with PUCCH 3 and PUCCH 4 in the time domain. PUCCH 4 overlaps with PUCCH 1 and PUCCH 2 in the time domain.

Whether different types of UCI carried by PUCCHs with different priorities can be multiplexed can be determined according to on one or more of the standard specifications, the higher layer signaling configuration, DCI indication, and the type of UCI carried by PUCCH (for example, whether a HARQ-ACK carried by PUCCH with priority 0 and CSI carried by PUCCH with priority 1 can be multiplexed is determined). PUCCH resource can be determined according to the following steps.

Step 0: PUCCHs in one slot that satisfy a timeline and/or a certain condition can form a set Z. Optionally, the condition can be PUCCHs with no repetitive transmissions. Optionally, according to on one or more of the standard specifications, the higher layer signaling configuration, DCI indication, PUCCHs in the set Z can be sorted based on one or more of the starting OFDM symbol, duration, priority, and the types of the carried UCI information of the PUCCHs in the set Z. For example, when the starting OFDM symbols of two PUCCHs in the set Z are different, the PUCCH with earlier starting OFDM symbol comes before the PUCCH with later starting OFDM symbol. When the starting OFDM symbols of two PUCCHs in the set Z are the same, the PUCCH with longer duration comes before a PUCCH with shorter duration. Alternatively, when the starting OFDM symbols of two PUCCHs in the set Z are the same, the PUCCH with shorter duration comes before the PUCCH with longer duration. Optionally, when both of the starting OFDM symbols and durations of two PUCCHs in the set Z are the same, the PUCCH with higher priority comes before the PUCCH with lower priority. Alternatively, when both of the starting OFDM symbols and durations of two PUCCHs in the set Z are the same, the PUCCH with lower priority comes before PUCCH with higher priority. Optionally, when the starting OFDM symbols, durations, and priorities of two PUCCHs in the set Z are all the same, the PUCCHs can be sorted according to UCI types. For example, the sorting of PUCCHs can be determined based on the sorting of the UCIs in other embodiments of the present invention. Alternatively, it is specified that a PUCCH carrying HARQ-ACK can be located before or after a PUCCH carrying CSI; a PUCCH carrying a HARQ-ACK can be located before or after a PUCCH carrying SR/LRR; and a PUCCH carrying CSI can be located before or after a PUCCH carrying SR/LRR. Optionally, PUCCH(s) that do(es) not satisfy multiplexing condition is(are) deleted from the set Z. The multiplexing condition can be determined according to a method specified in the embodiment.

Step 1: Select a first PUCCH in the set Z in order of time sequences; determine whether the PUCCH overlaps with other PUCCH(s) in the time domain; if the PUCCH does not overlap with other PUCCH(s) in the time domain, select a next PUCCH in the set Z in order of time sequences as the first PUCCH, and continue to perform the above determining; or if the PUCCH overlaps with other PUCCH(s) in the time domain, when a number of PUCCHs that overlap with the first PUCCH in the time domain is equal to 1, select a PUCCH that overlaps with the first PUCCH in the time domain; or when a number of PUCCHs that overlap with the first PUCCH in the time domain is greater than 1, select a first PUCCH thereof in order of time sequences, or select all PUCCHs that overlap with the first PUCCH in the time domain; multiplex UCIs carried by the selected PUCCHs into a new UCI and reselect a new PUCCH; delete the selected PUCCH(s) from the set Z; optionally, add the new PUCCH into the set Z; and re-sort the PUCCHs in the set Z according to the rule of step 0.

Step 2: Optionally, PUCCH(s) that do(es) not satisfy a multiplexing condition is(are) deleted from the set Z. The multiplexing condition can be determined according to a method specified in this embodiment. Repeat step 1 until all PUCCHs in the set Z do not overlap in the time domain, or the number of PUCCHs in the set Z is 1.

According to an embodiment of the present invention, the UE can be configured with the length of sub-slot configuration of a PUCCH configuration as 2 OFDM symbols. Alternatively, the UE can be configured with the length of sub-slot configuration of a PUCCH configuration as 7 OFDM symbols.

The time granularity of a PUCCH carrying HARQ-ACK information is sub-slot.

The time granularity of a PUCCH carrying SR/LRR and CSI information is slot.

When multiple PUCCHs with the same priority overlap in the time domain, the PUCCH resource can be determined according to the following steps.

Step 0: PUCCHs in one slot that satisfy the timeline and/or a condition can form a set Z. Optionally, the condition can be PUCCHs with no repetitive transmissions. When the starting OFDM symbols of two PUCCHs in the set Z are different, the PUCCH with earlier starting OFDM symbol comes before the PUCCH with later starting OFDM symbol. When the starting OFDM symbols of two PUCCHs in the set Z are the same, the PUCCH with longer duration comes before a PUCCH with shorter duration. Alternatively, when the starting OFDM symbols of two PUCCHs in the set Z are the same, the PUCCH with shorter duration comes before the PUCCH with longer duration. Optionally, when the starting OFDM symbols of two PUCCHs in the set Z are the same, the PUCCHs can be sorted according to UCI types. For example, the sorting of PUCCHs can be determined based on the sorting of the UCIs in other embodiments of the present invention. Alternatively, it is specified that a PUCCH carrying HARQ-ACK can be located before or after a PUCCH carrying CSI; a PUCCH carrying a HARQ-ACK can be located before or after a PUCCH carrying SR/LRR; and a PUCCH carrying CSI can be located before or after a PUCCH carrying SR/LRR. Optionally, when both of the starting OFDM symbols and durations of two PUCCHs in the set Z are the same, the PUCCHs can be sorted according to UCI types. For example, the sorting of PUCCHs can be determined based on the sorting of the UCIs in other embodiments of the present invention. Alternatively, it is specified that a PUCCH carrying HARQ-ACK can be located before or after a PUCCH carrying CSI; a PUCCH carrying a HARQ-ACK can be located before or after a PUCCH carrying SR/LRR; and a PUCCH carrying CSI can be located before or after a PUCCH carrying SR/LRR.

Step 1: Select a first PUCCH in the set Z in order of time sequences; determine whether the PUCCH overlaps with other PUCCH(s) in the time domain; if the PUCCH does not overlap with other PUCCH(s) in the time domain, select a next PUCCH in the set Z in order of time sequences as the first PUCCH, and continue to perform the above determining; or if the PUCCH overlaps with other PUCCH(s) in the time domain, when a number of PUCCHs that overlap with the first PUCCH in the time domain is equal to 1, select a PUCCH that overlaps with the first PUCCH in the time domain; or when a number of PUCCHs that overlap with the first PUCCH in the time domain is greater than 1, select a first PUCCH thereof in order of time sequences, or select all PUCCHs that overlap with the first PUCCH in the time domain; multiplex UCIs carried by the selected PUCCHs into a new UCI and reselect a new PUCCH; delete the selected PUCCH(s) from the set Z; optionally, add the new PUCCH into the set Z; and re-sort the PUCCHs in the set Z according to the rule of step 0.

Step 2: Repeat step 1 until all PUCCHs in the set Z do not overlap in the time domain, or the number of PUCCHs in the set Z is 1.

This method specifies how to multiplex UCI information carried by PUCCHs when multiple PUCCHs with different priorities overlap in the time domain. This method clarifies behavior of the UE, which ensures a consistent understanding of the PUCCH resource and the UCI information carried by the PUCCH between the UE and the base station, improves reliability of the PUCCH transmission, and improves network spectral efficiency. In addition, this method can further reduce a transmission delay of the UCI. Scheduling flexibility is improved by configuration.

According to an embodiment of the present invention, the UE can be configured with the length of sub-slot configuration of a PUCCH configuration as 2 OFDM symbols. Alternatively, the UE can be configured with the length of sub-slot configuration of a PUCCH configuration as 7 OFDM symbols.

The time granularity of a PUCCH carrying HARQ-ACK information is sub-slot.

The time granularity of a PUCCH carrying an SR/LRR and CSI information is slot.

A PUCCH that carries one or more of SR, LLR, and CSI can overlap in the time domain with one or more PUCCHs that carry HARQ-ACK information.

The UE is configured with multiple SPS (semi-persistent scheduling) PDSCH configurations. When the HARQ-ACK information is the HARQ-ACK codebook of a SPS PDSCH without DCI scheduling, the number of bits of the HARQ-ACK information can be greater than 2. One or more of SR, LLR, and CSI can be multiplexed with a first HARQ-ACK information in order of time sequences that overlaps in the time domain. The multiplexed UCI uses a PUCCH resource for the HARQ-ACK of the SPS PDSCH.

For example, the HARQ-ACK and the SR are multiplexed, and the PUCCH format of HARQ-ACK is PUCCH format 2 or PUCCH format 3 or PUCCH format 4. In this case, a number of bits of the HARQ-ACK is greater than 2. A PUCCH resource carrying the HARQ-ACK can be dynamically indicated by DCI. In the case of no DCI, a PUCCH resource carrying the HARQ-ACK of SPS PDSCH is determined according to a number of bits of the HARQ-ACK. The multiplexed UCI is composed of the HARQ-ACK information and the SR information, the HARQ-ACK information being located before the SR information. A PUCCH resource carrying the multiplexed UCI is determined according to the method of determining the PUCCH resource carrying the HARQ-ACK.

This method can improve scheduling flexibility. PUCCH resources for one or more of SR, LLR, and CSI are generally fixed resources. The PUCCH resource of the HARQ-ACK of SPS PDSCH can be configured as a maximum of 4 sets. When selecting the PUCCH resource, the selected set can be determined according to a number of bits of the UCI. In addition, the PUCCH resource of SR and/or LLR carries a smaller number of bits. When a number of bits of the HARQ-ACK is greater than 2, the PUCCH resource of SR and/or LLR cannot carry the multiplexed UCI information. The PUCCH resource for the HARQ-ACK of SPS PDSCH can carry UCI information with a larger number of bits through configuration. The time granularity of the PUCCH of HARQ-ACK is sub-slot, which can reduce the time delay compared with the PUCCH carrying one or more of SR, LLR, and CSI. By using the PUCCH resource for the HARQ-ACK of SPS PDSCH, the HARQ-ACK information transmitted simultaneously in one slot can further be increased, which improves network performance.

According to an embodiment of the present invention, the UE can be configured with PUCCH resources for SR and LRR.

When a PUCCH carrying SR and a PUCCH carrying LRR overlap in the time domain, the UE transmits the PUCCH carrying LRR instead of the PUCCH carrying SR. Alternatively, the UE transmits the PUCCH carrying SR instead of the PUCCH carrying LRR. Alternatively, the UE multiplexes the SR and the LRR, and then reselects a PUCCH resource to transmit the multiplexed SR and LRR.

When a PUCCH carrying LRR and a PUSCH overlap in the time domain, the UE transmits the PUCCH carrying LRR instead of the PUSCH. Alternatively, the UE multiplexes the LRR information onto the PUSCH, and then transmits the PUSCH. A resource occupied by the LRR on the PUSCH can be determined according to one or more of the standard specifications, the higher layer signaling configuration, and DCI indication. Method 1: When the PUSCH and the PUCCH for the LRR overlap in the time domain, a resource is reserved for the LRR through the standard specifications. Method 2: When the PUSCH and the PUCCH for the LRR overlap in the time domain, the higher layer signaling is used to specify whether to reserve a resource for the LRR. Method 3: When the PUSCH and the PUCCH for the LRR overlap in the time domain, DCI is used to dynamically indicate whether to reserve a resource for the LRR.

This method specifies how the UE selects the UCI information and the PUCCH resource when a PUCCH carrying SR and a PUCCH carrying LRR overlap in the time domain. This method further specifies how the UE selects a physical channel carrying the UCI, when a PUCCH carrying LRR and a PUSCH overlap in the time domain. This method clarifies behavior of the UE, which ensures a consistent understanding of the PUCCH resource and the UCI information carried by the PUCCH between the UE and the base station, improves reliability of the PUCCH transmission, and improves network spectral efficiency.

According to an embodiment of the present invention, the UE can be configured with uplink configured grant PUSCH resource, and the UE, through a higher layer signaling configuration, would not allow the multiplexing of the HARQ-ACK information on the configured grant PUSCH resource #1. When the configured grant PUSCH resource #1 and a PUCCH carrying the HARQ-ACK information overlap in the time domain, the HARQ-ACK information is transmitted instead of the configured grant PUSCH #1. An improved method is that when the configured grant PUSCH resource #1 and the PUCCH carrying the HARQ-ACK information overlap in the time domain, and the HARQ-ACK information is carried by another PUSCH (PUSCH #2), if PUSCH #1 does not overlap with PUSCH #2 in the time domain, and PUSCH #1 satisfies the timeline, then PUSCH #1 and PUSCH #2 are transmitted.

When PUSCH #2 is scheduled by DCI, it can be specified that a distance between the starting position of the first OFDM symbol of PUSCH #1 and the ending position of the last OFDM symbol of the DCI scheduling PUSCH #2 is less than N OFDM symbols/slots/sub-slots. It may alternatively be specified that a distance between the ending position of the last OFDM symbol of PUSCH #1 and the ending position of the last OFDM symbol of the DCI scheduling PUSCH #2 is less than N OFDM symbols/slots/sub-slots. It may alternatively be specified that a distance between the ending position of the last OFDM symbol of the PUSCH #1 and the starting position of the first OFDM symbol of the DCI scheduling PUSCH #2 is less than N OFDM symbols/slots/sub-slots. It may alternatively be specified that a distance between the starting position of the first OFDM symbol of PUSCH #1 and the starting position of the first OFDM symbol of the DCI scheduling PUSCH #2 is less than N OFDM symbols/slots/sub-slots. N can be 0, or N can be a decimal, or N can be an integer.

When there is no scheduling for PUSCH #2, if PUSCH #1 and PUSCH #2 do not overlap in the time domain, PUSCH #1 and PUSCH #2 are transmitted.

This method specifies the timing condition that should be satisfied for transmitting the configured grant PUSCH that cannot carry the HARQ-ACK information. When the configured grant PUSCH that cannot carry the HARQ-ACK information satisfies the timing condition, the configured grant PUSCH that cannot carry the HARQ-ACK information and the configured grant PUSCH carrying the HARQ-ACK information can be transmitted. Spectrum utilization of the network is improved, and a transmission delay of the configured grant PUSCH that cannot carry the HARQ-ACK information is reduced.

In another embodiment, the UE is configured with a semi-static HARQ-ACK codebook, for example, a type-1 HARQ-ACK codebook in 3GPP TS 38.213. The UE can receive only one unicast PDSCH in one slot. For the type-1 HARQ-ACK codebook in 3GPP TS 38.213, for activated subband of a serving cell, the UE feeds back only 1 bit of HARQ-ACK information in each slot. The UE can be configured with multiple activated SPS PDSCH configurations. When the UE receives DCI indicating a SPS PDSCH release on a serving cell in a slot, the UE feeds back HARQ-ACK information for the DCI indicating SPS PDSCH release. In this case, the UE does not feedback HARQ-ACK information for the SPS PDSCH in the serving cell in the slot. The DCI indicating SPS PDSCH release should satisfy a certain timeline.

For example, the ending position of the DCI indicating SPS PDSCH release is not later than or earlier than the ending position of the activated SPS PDSCH with the smallest index in the slot. For another example, the ending position of the DCI indicating SPS PDSCH release is not later than or earlier than the ending position of the SPS PDSCH with the smallest index in SPS PDSCH configurations included in the DCI indicating SPS PDSCH release in the slot. For another example, the ending position of the DCI indicating SPS PDSCH release is not later than or earlier than the ending position of the activated SPS PDSCH with the smallest index.

For another example, the starting position of the DCI indicating SPS PDSCH release is not later than or earlier than the ending position of the activated SPS PDSCH with the smallest index in the slot. For another example, the starting position of the DCI indicating SPS PDSCH release is not later than or earlier than the ending position of the SPS PDSCH with the smallest index in SPS PDSCH configurations included in the DCI indicating SPS PDSCH release in the slot. For another example, the starting position of the DCI indicating SPS PDSCH release is not later than or earlier than the ending position of the activated SPS PDSCH with the smallest index.

For another example, the ending position of the DCI indicating SPS PDSCH release is not later than or earlier than the starting position of the activated SPS PDSCH with the smallest index in this slot. For another example, the ending position of the DCI indicating SPS PDSCH release is not later than or earlier than the starting position of the SPS PDSCH with the smallest index in SPS PDSCH configurations included in the DCI indicating SPS PDSCH release in the slot. For another example, the ending position of the DCI indicating SPS PDSCH release is not later than or earlier than the starting position of the activated SPS PDSCH with the smallest index.

For another example, the starting position of the DCI indicating SPS PDSCH release is not later than or earlier than the starting position of the activated SPS PDSCH with the smallest index in the slot. For another example, the starting position of the DCI indicating SPS PDSCH release is not later than or earlier than the starting position of the SPS PDSCH with the smallest index in SPS PDSCH configurations included in the DCI indicating SPS PDSCH release in the slot. For another example, the starting position of the DCI indicating SPS PDSCH release is not later than or earlier than the starting position of the activated SPS PDSCH with the smallest index.

If the timeline is not satisfied, the UE considers it a network configuration error, or the UE feeds back HARQ-ACK information for the activated SPS PDSCH with the smallest index on the serving cell in the slot.

This method defines behavior of the UE after receiving the DCI indicating a SPS PDSCH release, and specifies the timeline that effective DCI indicating a SPS PDSCH release should satisfy. This ensures a consistent understanding of the HARQ-ACK codebook between the base station and the UE, improves reliability of the HARQ-ACK codebook, and reduces complexity of UE implementation.

FIG. 5 is a block diagram of a first type of transceiver node according to an embodiment of the present invention.

Referring to FIG. 5, the first type of transceiver node 300 may include a transceiver 301 and a controller 302.

The transceiver 301 can be configured to transmit a first type of data and/or a first type of control signaling to a second type of transceiver node and receive a second type of data and/or a second type of control signaling from the second type of transceiver node through an uplink physical channel in an uplink time unit.

The controller 302 can be a circuit-specific integrated circuit or at least one processor. The controller 102 can be configured to control an overall operation of the first type of transceiver node, including controlling the transceiver 301 to transmit the first type of data and/or the first type of control signaling to the second type of transceiver node, and receive the second type of data and/or the second type of control signaling from the second type of transceiver node through a second type of physical channel in a determined second type of time unit, wherein the second type of data and/or the second type of control signaling and the second type of time unit and/or the second type of physical channel for transmitting the second type of data and/or the second type of control signaling are determined by the second type of transceiver node based on the received first type of data and/or first type of control signaling.

In the following description, base station is taken as an example (rather than a limitation) to describe the first type of transceiver node, and UE is taken as an example (rather than a limitation) to describe the second type of transceiver node; a downlink time unit is taken as an example (rather than a limitation) to describe the first type of time unit, and an uplink time unit is taken as an example (rather than a limitation) to describe the time unit. Downlink data and/or downlink control signaling (rather than a limitation) are/is used to describe the first type of data and/or the first type of control signaling. Uplink control signaling (rather than a limitation) is used to describe the second type of control signaling.

FIG. 6 is a flowchart of a method performed by a base station according to an embodiment of the present invention.

First, at step 401, the base station transmits downlink data and/or downlink control signaling to UE.

At step 402, the base station receives uplink data and/or uplink control signaling through an uplink physical channel in an uplink time unit, wherein the uplink data and/or the uplink control signaling, as well as the uplink time unit and the uplink physical channel for transmitting the uplink data and/or the uplink control signaling are determined by the UE based on the received downlink data and/or downlink control signaling.

Those skilled in the art will understand that, the base station decodes the second type of data and/or the second type of control signaling based on a method corresponding to the method performed by the UE in the foregoing embodiment.

Those skilled in the art will understand that the illustrative embodiments described above are described herein and are not intended to be limiting. It should be understood that any two or more of the embodiments disclosed herein may be combined in any combination. In addition, other embodiments may be utilized and other changes may be made without departing from the spirit and scope of the subject matter presented herein. It will be readily understood that the aspects of the invention of the present disclosure as generally described herein and shown in the accompanying drawings may be arranged, substituted, combined, separated, and designed in various different configurations, all of which are contemplated herein.

Those skilled in the art will understand that various illustrative logical blocks, modules, circuits, and steps described in this application may be implemented as hardware, software, or a combination thereof. To clearly illustrate this interchangeability of hardware and software, various illustrative components, blocks, modules, circuits, and steps are generally described above in a form of function sets thereof. Whether such function sets are implemented as hardware or software depends on a specific application and design constraints imposed on the overall system. A skilled person may implement the described function sets in different manners for each specific application, but such design decisions should not be interpreted as causing a departure from the scope of this application.

These various illustrative logical blocks, modules, and circuits described in this application may be implemented or executed by general-purpose processors, digital signal processors (DSPs), application specific integrated circuits (ASICs), field programmable gate arrays (FPGAs) or other programmable logic devices, discrete gates or transistor logics, discrete hardware assemblies, or any combination thereof designed to execute functions described herein. A general-purpose processor may be a microprocessor, but in an alternative solution, the processor may be any conventional processor, controller, microcontroller, or state machine. The processor may also be implemented as a combination of computing devices, such as a combination of a DSP and a microprocessor, multiple microprocessors, one or more microprocessors that cooperate with a DSP core, or any other such configuration.

The steps of the methods or algorithms described in this application may be directly embodied in hardware, in a software module executed by a processor, or in a combination thereof. The software module may reside in a RAM memory, a flash memory, a ROM memory, an EPROM memory, an EEPROM memory, a register, a hard disk, a removable disk, or any other form of storage medium known in the art. An exemplary storage medium is coupled to the processor so that the processor can read/write information from/to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

In one or more exemplary designs, the functions may be implemented in hardware, software, firmware, or any combination thereof. If implemented in software, respective functions may be stored on or transmitted as one or more instructions or code on a computer-readable medium. The computer-readable medium includes both a computer storage medium and a communication medium, the latter including any medium that facilitates transfer of a computer program from one place to another. The storage medium may be any available medium that is accessible by a general-purpose or special-purpose computer.

The embodiments of this application are only for easy description and help to comprehensively understand this application, and are not intended to limit the scope of this application. Therefore, it should be understood that, in addition to the embodiments disclosed herein, all modifications and changes or forms of modifications and changes derived from the technical idea of the present application fall within the scope of this application.

The invention claimed is:

1. A method performed by a user equipment (UE) in a wireless communication system, the method comprising:

receiving, from a base station, first configuration information associated with a first physical uplink control channel (PUCCH) and second configuration information associated with a second PUCCH;

identifying that the first PUCCH that includes first hybrid automatic repeat request acknowledgement (HARQ-ACK) information overlaps the second PUCCH that includes second HARQ-ACK information and a scheduling request (SR);

multiplexing the first HARQ-ACK information, the second HARQ-ACK information and the SR in a PUCCH; and transmitting, to the base station, the PUCCH including the first HARQ-ACK information, the second HARQ-ACK information, and the SR, wherein a second priority index related to the second HARQ-ACK information and the SR is larger than a first priority index related to the first HARQ-ACK information, and the PUCCH is associated with the second configuration information.

2. The method of claim 1, wherein the SR is appended to the second HARQ-ACK information.

3. The method of claim 1, wherein the SR, the first HARQ-ACK information, and the second HARQ-ACK information are transmitted simultaneously.

4. The method of claim 1, wherein the PUCCH including the first HARQ-ACK information, the second HARQ-ACK information, and the SR is the second PUCCH.

5. A method performed by a base station in a wireless communication system, the method comprising:

transmitting, to a user equipment (UE), first configuration information associated with a first physical uplink control channel (PUCCH) that includes first hybrid automatic repeat request-acknowledgement (HARQ- ACK) information, and second configuration information associated with a second PUCCH that includes second HARQ-ACK information and a scheduling request (SR), wherein a first priority index is related to the first HARQ-ACK information and a second priority index is related to the second HARQ-ACK information and the SR; and receiving, from the UE, a PUCCH including the first HARQ-ACK information, the second HARQ-ACK information, and the SR, wherein the second priority index is larger than the first priority index, and the PUCCH is associated with the second configuration information, wherein the first HARQ-ACK information, the second HARQ-ACK information, and the SR are multiplexed in the PUCCH, and the first PUCCH overlaps the second PUCCH.

6. The method of claim 5, wherein the SR is appended to the second HARQ-ACK information.

7. The method of claim 5, wherein the SR, the first HARQ-ACK information, and the second HARQ-ACK information are transmitted simultaneously.

8. The method of claim 5, wherein the PUCCH including the first HARQ-ACK information, the second HARQ-ACK information, and the SR is the second PUCCH.

9. A user equipment (UE) in a wireless communication system, comprising a transceiver; and at least one processor coupled to the transceiver;

wherein the at least one processor is configured to:

receive, from a base station, first configuration information associated with a first physical uplink control channel (PUCCH) and second configuration information associated with a second PUCCH, identify that the first PUCCH that includes first hybrid automatic repeat request acknowledgement (HARQ-ACK) information overlaps the second PUCCH that includes second HARQ-ACK information and a scheduling request (SR), multiplex the first HARQ-ACK information, the second HARQ-ACK information, and the SR in a PUCCH, and transmit, to the base station, the PUCCH including the first HARQ-ACK information, the second HARQ-ACK information, and the SR, wherein a second priority index related to the second HARQ-ACK information and the SR is larger than a first priority index related to the first HARQ-ACK information, and the PUCCH is associated with the second configuration information.

10. The UE of claim 9, wherein the SR is appended to the second HARQ-ACK information.

11. The UE of claim 9, wherein the SR, the first HARQ-ACK information, and the second HARQ-ACK information are transmitted simultaneously.

12. The UE of claim 9, wherein the PUCCH including the first HARQ-ACK information, the second HARQ-ACK information, and the SR is the second PUCCH.

13. A base station in a wireless communication system, comprising:

a transceiver; and at least one processor coupled to the transceiver, wherein the at least one processor is configured to:

transmit, to a user equipment (UE), first configuration information associated with a first physical uplink control channel (PUCCH) that includes first hybrid automatic repeat request-acknowledgement (HARQ-ACK) information, and second configuration information associated with a second PUCCH that includes second HARQ-ACK information and a scheduling request (SR), wherein a first priority index is related to the first HARQ-ACK information, and a second priority index is related to the second HARQ-ACK information and the SR, and receive, from the UE, a PUCCH including the first HARQ-ACK information, the second HARQ-ACK information, and the SR, wherein the second priority index is larger than the first priority index, and the PUCCH is associated with the second configuration information, wherein the first HARQ-ACK information, the second HARQ-ACK information, and the SR are multiplexed in the PUCCH, and the first PUCCH overlaps the second PUCCH.

14. The base station of claim 13, wherein the SR is appended to the second HARQ-ACK information.

15. The base station of claim 13, wherein the SR, the first HARQ-ACK information, and the second HARQ-ACK information are transmitted simultaneously.

16. The base station of claim 13, wherein the PUCCH including the first HARQ-ACK information, the second HARQ-ACK information, and the SR is the second PUCCH.

\* \* \* \* \*